United States Patent
Burcz

[11] 3,709,066
[45] Jan. 9, 1973

[54] AUTOMATIC TRANSMISSION CONTROL CIRCUIT WITH ELECTRICALLY OPERATED VALVES

[75] Inventor: Lawrence D. Burcz, Livonia, Mich.
[73] Assignee: Ford Motor Company, Dearborn, Mich.
[22] Filed: May 21, 1970
[21] Appl. No.: 39,492

[52] U.S. Cl. ..................74/866, 74/864, 74/869
[51] Int. Cl. .............................B60k 21/00
[58] Field of Search.........74/863, 864, 867, 869, 868

[56] References Cited

UNITED STATES PATENTS

| | | | |
|---|---|---|---|
| 3,640,156 | 2/1972 | Mori et al. | 74/866 |
| 3,640,157 | 2/1972 | Schaefer | 74/869 |
| 3,667,322 | 6/1972 | Noguchi et al. | 74/868 X |
| 3,621,735 | 11/1971 | Lemieux | 74/869 X |
| 3,505,907 | 4/1970 | Fox et al. | 74/753 |
| 3,230,791 | 1/1966 | Kelley et al. | 74/864 |
| 2,769,350 | 11/1956 | Lucia et al. | 74/869 |
| 3,053,107 | 9/1962 | Winchell | 74/868 |
| 3,336,815 | 8/1967 | Leonard | 74/869 X |
| 3,400,613 | 9/1968 | Johnson et al. | 74/869 |

Primary Examiner—Milton Kaufman
Assistant Examiner—Thomas C. Perry
Attorney—John R. Faulkner and Donald J. Harrington

[57] ABSTRACT

A control system for a multiple-ratio power transmission mechanism comprising fluid pressure operated clutch and brake servos adapted to control the relative motion of torque delivery gear elements, a valve circuit including electrically actuated pilot valve operators for controlling pressure distribution to the servos, a pressure regulator valve system communicating with the valve circuit for any given operating condition, said regulator valve system comprising a cutback pressure valve and a coasting boost valve that are effective to modify the regulating characteristics of the regulator valve when the driven speed and engine vacuum under any given operating condition are within predetermined operating zones.

8 Claims, 5 Drawing Figures

Fig.3

AUTOMATIC TRANSMISSION CONTROL CIRCUIT WITH ELECTRICALLY OPERATED VALVES

GENERAL DESCRIPTION OF THE INVENTION

My invention relates generally to automatic power transmission controls for an automotive vehicle driveline. The transmission includes planetary gear elements capable of establishing torque delivery paths, each of which has a distinct ratio. The relative motion of the gear elements is controlled by fluid pressure operated servos which communicate with a pressure source. Distribution of pressure from the source to the servos is controlled by selectively operated shift valves. The shift valves in turn are triggered by pilot valve operators which respond to signals distributed to them from a control module that senses engine intake manifold pressure and output shaft speed.

The pressure distributed to the servos is regulated by a regulator valve system which includes a cutback valve and a pressure boost control valve for modifying the regulated pressure level in the valve system under certain driving conditions in a forward drive range as well as under certain other driving conditions in the reverse drive range.

The regulator valve system includes a multiple land valve spool having formed thereon three pressure areas, each of which is subjected to a different pressure. The pressure forces established by the pressures acting on the valve spool are opposed by a valve spring. The force of the spring is supplemented by a pressure signal force received from an engine intake manifold pressure sensor thereby rendering the regulated pressure level in the valve system insensitive to engine manifold pressure which is an indicator of engine torque.

During reverse drive operation the torque transmitting capacity of the friction elements in the transmission driveline must be increased. This is achieved by exhausting one of the pressure areas on the valve spool of the regulator valve system. The supply of control pressure to that pressure area is controlled by the same valve element that controls distribution of pressure to the forward drive friction clutch which is engaged only during forward drive. When the forward drive clutch is de-energized during reverse drive operation, the pressure signal acting on the multiple land valve spool is exhausted and the operating pressure level for the valve system increases.

The torque transmitting capacity of the servos is increased also during operation at low speeds with high engine manifold pressure. This condition exists during initial acceleration when the hydrokinetic torque converter in the transmission is operating in a relatively high torque ratio range.

At higher speeds for any given engine manifold pressure, the torque ratio approaches unity and a cutback in the operating pressure level in the valve system should be made in order to avoid excessive clutch and brake capacity. This is achieved in my valve circuit by exhausting a second control area on the multiple land valve spool. An exhaust flow path leading to that second control area is controlled by a solenoid operated valve which in turn receives an appropriate signal from the control module to effect a cutback during operation in the initial acceleration drive range. A corresponding cutback occurs also at high output shaft speeds and at low manifold pressures. This produces a control circuit pressure boost during coasting at high speeds thereby avoiding excessive slippage in the friction elements during engine braking.

PARTICULAR DESCRIPTION OF THE INVENTION

Figure 1:
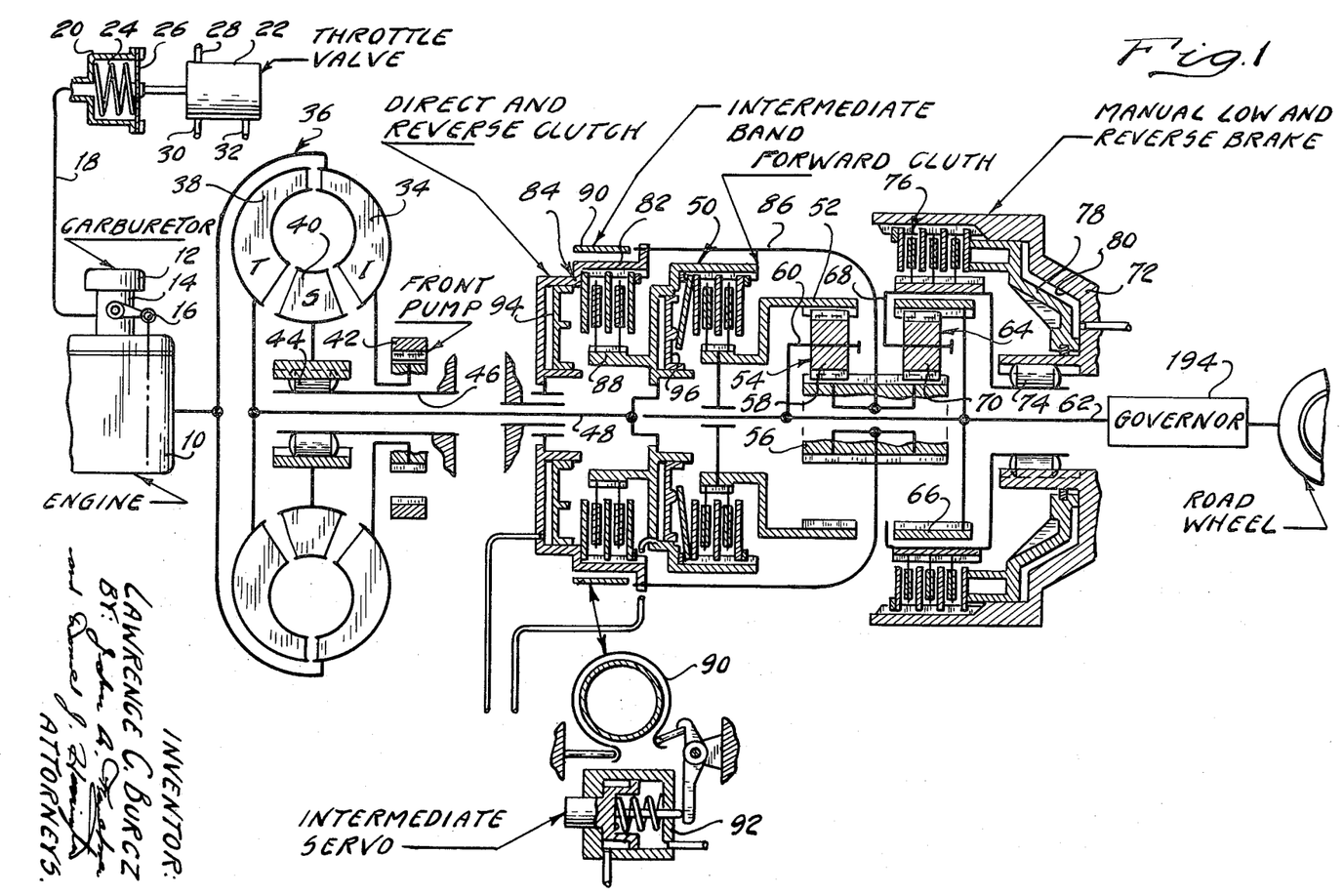
FIG. 1 shows in schematic form a longitudinal cross sectional view of the torque delivery elements in a transmission that includes the improvements of my invention.

In FIG. 1 reference character 10 represents an internal combustion engine for an automotive vehicle driveline. It includes a carburetor 12 which supplies the air-fuel mixture intake manifold 14. The delivery of a mixture into the manifold is controlled by a driver operated throttle valve the operating level for which is shown at 16.

A vacuum pressure line 18 extends to a throttle valve actuator 20 where it is connected mechanically to the adjustable throttle valve assembly 22. When the engine manifold pressure is high, spring 24 causes flexible diaphragm 26 to deflect thereby adjusting the valve 22 to a position that will cause an increase in the output pressure signal provided by the assembly. A decrease in manifold pressure will result in deflection of diaphragm 26 against the opposing forces of spring 24 thereby causing a reduction of the magnitude of the pressure signal, the latter being distributed to line 28. Control pressure is distributed to the throttle valve 22 through control pressure line 30. An exhaust port is shown at 32.

The crankshaft of engine 10 is connected directly to impeller 34 of hydrokinetic torque converter 36. Converter 36 includes also turbine 38 arranged in toroidal fluid flow relationship with respect to impeller 34. A bladed stator 40 is situated between the flow exit section of turbine 38 and the flow entrance section of impeller 34. A positive displacement gear pump 42 is drivably connected to the impeller 34 so that it may be powered by the engine 10. Pump 42 serves as a pressure source for the circuit that will be described with reference to FIGS. 4A and 4B.

Torque converter 36 multiplies the engine torque in the usual fashion as stator 40 serves as a hydrokinetic reaction member. The reaction torque of the stator 40 is distributed through overrunning brake 44 to the transmission housing through a stationary sleeve shaft 46.

Turbine 38 develops a driving torque which is distributed through turbine shaft 48 and through forward clutch 50 to the ring gear 52 of a first planetary gear unit 54. This gear unit includes, in addition to the ring gear 52, a sun gear 56 and a set of planet pinions 58.

Carrier 60 journals the pinions 58 rotatably as they mesh with the ring gear 52 and the sun gear 56. Carrier 60 is connected directly to output shaft 62.

A second simple planetary gear unit 64 has a ring gear 66 also connected to output shaft 62. The gear unit 64 and gear unit 54 have a common sun gear; namely, the sun gear 56. Carrier 68 journals rotatably planet pinions 70 which mesh drivably with sun gear 56 and ring gear 66.

During normal operation in a forward drive range, carrier 68 is adapted to be anchored to housing 72 by an overrunning brake 74. The function of the brake 74 is complemented by a friction disc brake 76 which may be selectively applied and released by a fluid pressure operated servo that includes an annular piston 78, slidably situated in an annular cylinder 80 defined by the housing 72.

Carrier 68 may accommodate the first driving torque when the brake 76 is applied. It is applied during manual-low operation and reverse drive.

Sun gear 56 is connected to an output clutch element 82 of direct-and-reverse clutch 84. Element 82 is connected to the sun gear 56 through drive shell 86, the latter encircling the forward clutch 50 and gear unit 54. The input clutch element 88 of direct-and-reverse clutch 84 is connected directly to the turbine shaft 48.

An intermediate speed ratio brake band 90 surrounds the clutch element 82. It is applied and released by fluid pressure operated brake servo 92.

Direct-and-reverse clutch 84 can be applied and released by a fluid pressure operated clutch servo which includes an annular piston 94 located in an annular cylinder formed by the clutch element 82. Similarly, the forward clutch 50 can be applied and released by a fluid pressure operated clutch servo which includes an annular piston 96 slidably situated in an annular cylinder which is common to the clutch element 88.

During low speed ratio operation, clutch 50 is applied. Turbine torque then is delivered to the ring gear 52. Because of the resistance offered by shaft 62 to the rotation of the carrier 60, sun gear 56 tends to drive in a reverse direction. This imparts a forward driving torque to the ring gear 66 and the output shaft 62, as the carrier 68 acts as a reaction point. Torque on the carrier 68 is distributed to the housing through either the forward brake 74 or the friction brake 76, or both. Forward driving torque is applied also to the carrier 60. Thus, a split torque delivery path is established between the turbine and the output shaft 62 through the planetary gearing.

Intermediate speed ratio operation is achieved by applying brake band 90, thereby anchoring sun gear 56. Carrier 68 is caused to freewheel under these conditions as sun gear 56 acts as a reaction point. All of the torque delivered to output shaft 62 is received from carrier 60.

High speed, direct-drive operation is achieved by applying simultaneously both clutches 84 and 50 as the intermediate brake band 90 is released. This locks together the elements of the planetary gear unit for rotation in unison as a direct connection is established between turbine shaft 48 and the output shaft 62.

Reverse drive operation is achieved by releasing the forward drive clutch 50 and applying the direct-and-reverse clutch 84. Also friction disc brake 76 is applied.

Under these conditions, the carrier 68 acts as a reaction point as input torque is delivered to the sun gear 56. This causes reverse motion of the ring gear 66.

Figure 4:
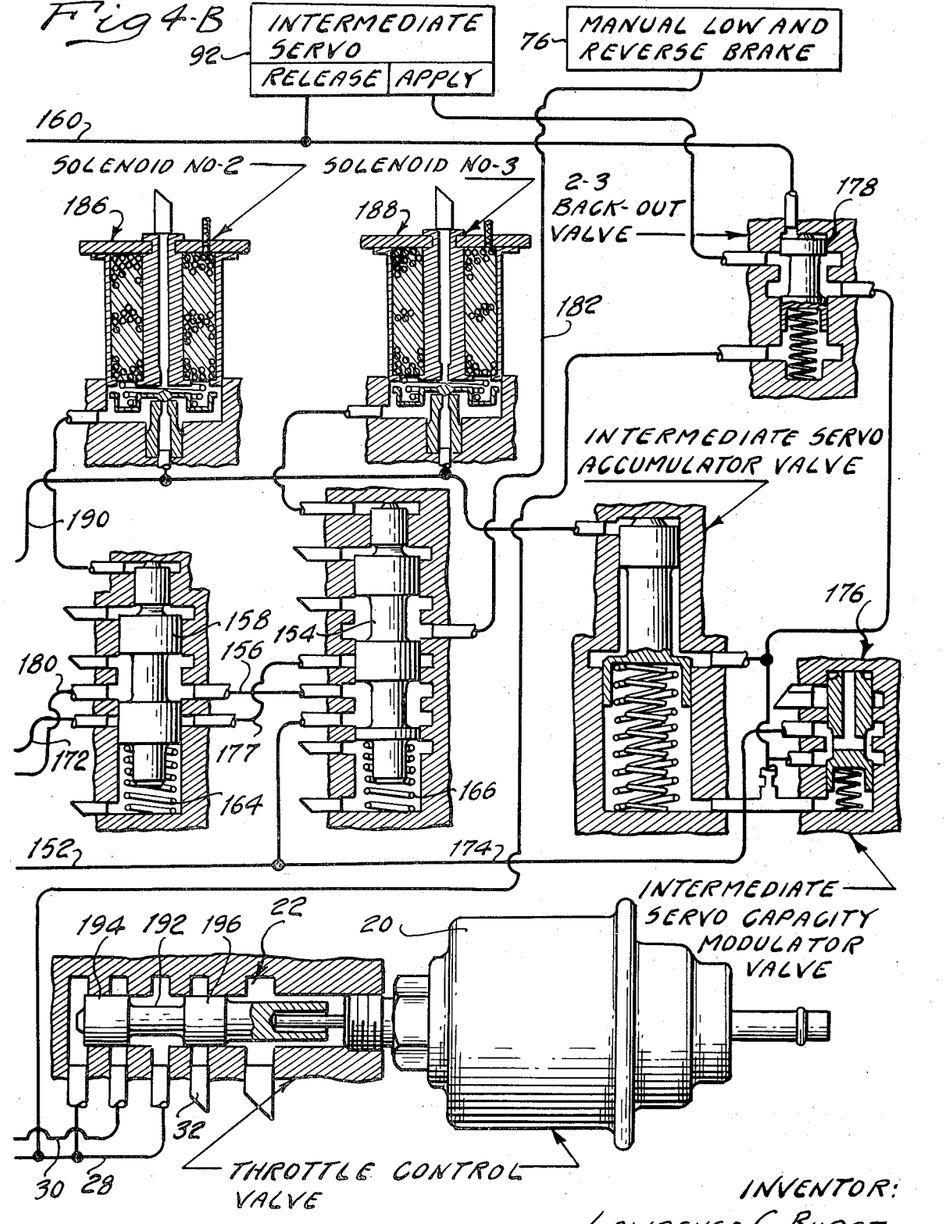
FIGS. 4A and 4B show a schematic valve diagram of the principal elements of the control circuit of my invention.
Figure 4A:
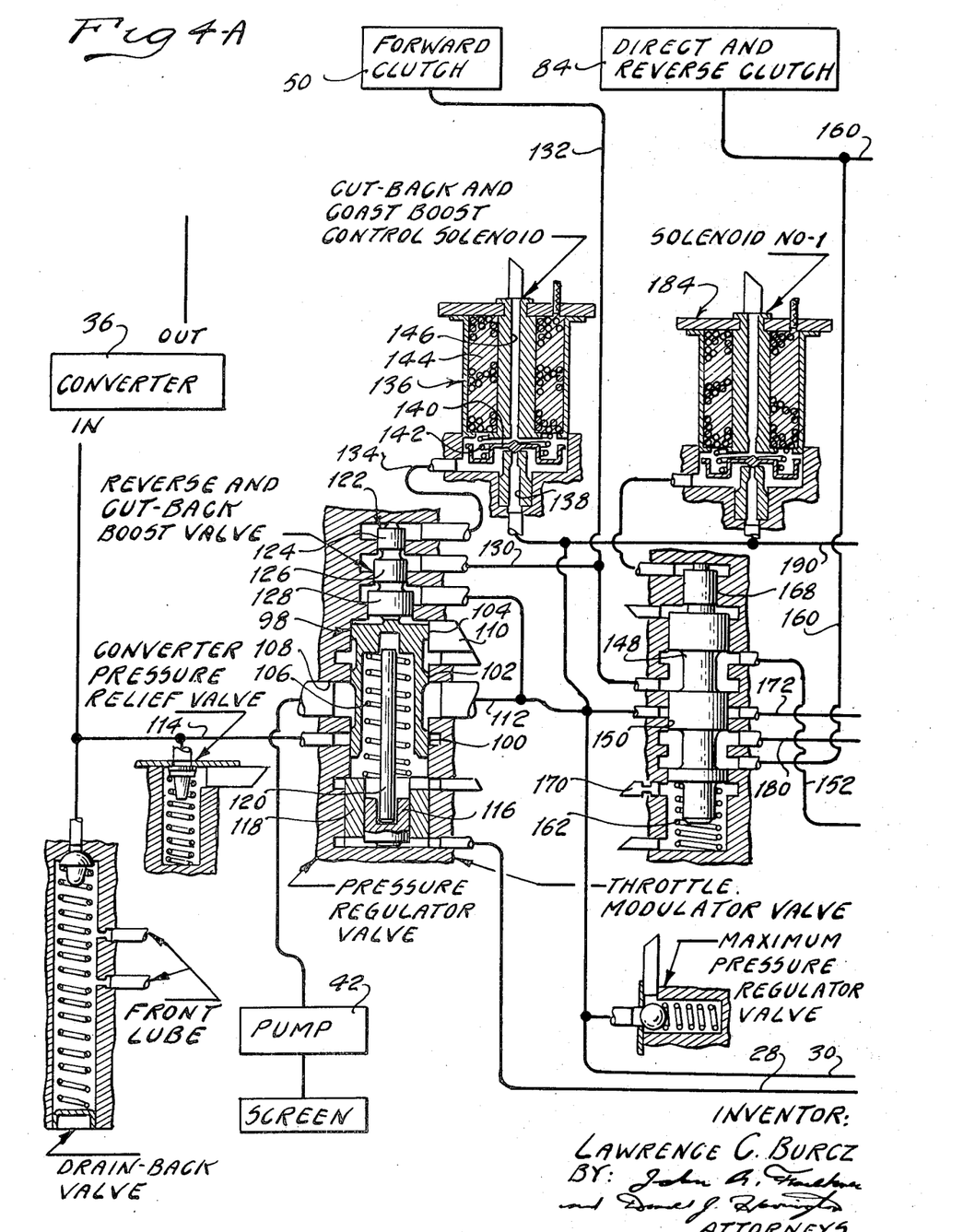

The circuitry for achieving the engagement and release of the transmission, clutches and brakes is shown in FIGS. 4A and 4B.

In FIG. 4A I have shown a main pressure regulator 98 having a valve spool with three spaced valve lands 100, 102 and 104. These are slidably situated in a valve chamber which defines internal valve lands that register with the valve lands of the regulator valve spool. Valve spring 106 normally urges the regulator valve spool in an upward direction as seen in FIG. 4. Pump 42 communicates with inlet port 108 of the regulator valve 98.

An exhaust port 110 communicates with the regulator valve 98. Valve land 102 controls the degree of communication between the ports 108 and 110 so that a regulated pressure is maintained in outlet passage 112. Land 100 controls the degree of communication between the port 108 and converter feed passage 114, which communicates with the inlet side of the converter 36 to maintain a suitable charge pressure in the converter shell. A throttle modulator valve element 116 is slidably situated in the sleeve 118 located directly below the regulator valve spool. The lower end of element 116 communicates with throttle pressure passage 28. The pressure force established with the throttle pressure in passage 28 complements the force of the spring 106. The force on the valve element 116 is transmitted to the regulator valve spool through valve stem 120.

Located at the upper end of the regulator valve spool is a reverse and cutback boost valve 122. It includes three valve lands, 124, 126 and 128, each of which has a different diameter. The valve 122 engages the regulator valve spool. The differential area defined by the lands 126 and 128 communicates with the output pressure passage 112 thereby providing a feedback pressure force which opposes the force of the spring 106.

The differential area provided by lands 124 and 126 is pressurized whenever the transmission is conditioned for forward drive operation. It communicates with passage 130 which in turn communicates with a forward clutch feed passage 132. The forward clutch 50 is disengaged during reverse drive operation. Thus the pressure force acting on the differential area of lands 124 and 126 is exhausted during reverse drive operation. This increases the net force acting on the regulator valve spool thus causing an increase in line pressure during reverse drive operation.

The upper end of the land 124 communicates with signal passage 134. Passage 134 is pressurized during normal operation but is exhausted when a pressure boost is desired. Distribution of control pressure to passage 134 is controlled by a cutback and coast-boost control valve identified generally by reference character 136. This valve includes a feed orifice 138 and a movable valve element 140 which registers with the orifice 138. The outlet side of the orifice 138 communicates with the passage 134.

Element 140 normally is urged to a port closing position, as indicated in FIG. 4A, by valve spring 142. The valve element 140, which is of ferrous metal, is urged out of registry with the orifice 138 by the electromagnetic force of solenoid windings 144 whenever the solenoid windings are energized with a controlled voltage. When the solenoid windings are energized, pressure is distributed to the upper end of the land 124. When the solenoid windings are de-energized, orifice 138 is closed by valve element 140, and passage 134 then communicates with exhaust passage 146 extending through the core of the solenoid windings 144.

Control pressure for the forward clutch 50 is controlled by shift valve 148 slidably positioned in valve chamber 150. When the valve element 148 is in the position shown, pressure distribution to passage 132 from passage 112 is blocked. Passage 132 at the same time is brought into communication with passage 152 which extends to low-and-reverse solenoid shift valve 154 and through that valve to passage 156. Passage 156 in turn is exhausted through the intermediate solenoid valve 158.

Passage 160, which extends from the valve 148 to the direct-and-reverse clutch 84 and to the release side of the intermediate servo 92, also is exhausted through the intermediate servo valve 158.

Valve 148 is normally urged in an upward direction as shown in FIG. 4A by valve spring 162. Valve 158 normally is urged in an upward direction by valve spring 164. Similarly, low-and-reverse valve 154 is urged in an upward direction by valve spring 166.

When pressure is applied to the upper end of valve land 168, which forms a part of valve 148, valve 148 is moved downwardly against the force of spring 162. This brings passage 132 in fluid communication with passage 112 and the forward clutch becomes applied. Passage 160 becomes exhausted through exhaust port 170 formed in the chamber 150. Pressure is distributed also to passage 172 thereby making pressure available to the valve 158 in anticipation of a shift from low speed ratio to the intermediate speed ratio.

When valve 158 is in the position shown in FIG. 4B, passage 172 is blocked. When it assumes a downward position against the opposing forces of spring 164, passage 172 is brought into communication with passage 156, which communicates through the valve 154 with passage 174. This extends through the intermediate servo capacity modulator valve 176 and the 2–3 backout valve 178 to the apply side of the intermediate servo 92. Pressure is distributed also at that time to cross-over passage 177.

If valve 148 now is caused to move in an upward direction, communication is established between passage 180 and pressurized passage 172 through the valve 158 and between passage 180 and passage 160 through the valve 148. This pressurizes the direct-and-reverse clutch 84 as well as the release side of the intermediate servo 92.

Movement of the valve 154 in a downward direction against the opposing force of spring 166 will cause communication to be established between passage 177 and passage 182, which extends to the manual low-and-reverse brake 76 thereby conditioning the driveline for reverse drive operation. Clutch 84 also supplies as passage 160 communicates with passage 180, the latter in turn connunicating with passage 172 through valve 185 which also assumes a downward position.

Valves 148, 158, and 154 are actuated by solenoid valves similar to the valve 136. These are identified respectively by reference characters 184, 186 and 188. These valves open and close orifices which establish and disestablish communication between the upper ends of valves 148, 158 and 154, respectively. Pressure is supplied to these control orifices through the passage 190 which serves also to feed the inlet side of orifice 138 for the solenoid valve 136.

The throttle pressure signal made available to the passage 28 by valve 22 is developed in the usual way by means of a modulator valve element 192 slidably situated in a valve bore which has internal valve lands registering with spaced valve lands 194 and 195. The signal in passage 28 acts on the left hand side of the valve land 194 and urges the element 192 in a direction that opposes the forces acting on diaphragm 26.

Figure 2:
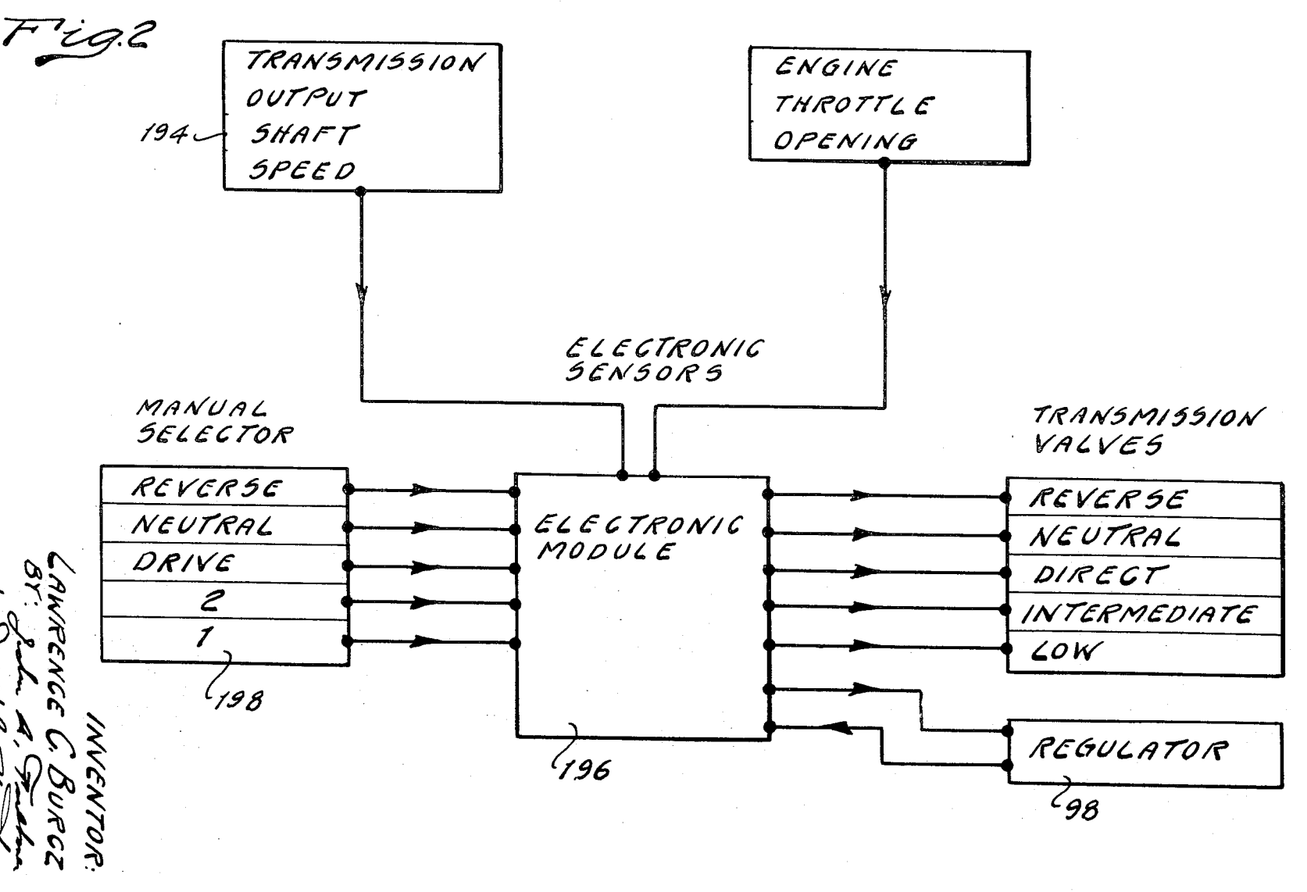
FIG. 2 is a view showing in block diagram form the principal components of the controls of my invention.

The solenoid controls that trigger the operation of the various shift valves 98, 148, 158 and 154 are in turn controlled by an electronic module illustrated in FIG. 2. This module receives a transmission output shaft signal from a governor 193 connected, as shown in FIG. 1, to the driven shaft 62. Reference may be made to U.S. patent No. 3,327,554 for a description of a governor suitable for use in this environment. The electronic module, which is indicated at 196, also receives a signal from an engine manifold vacuum pressure sensor similar to that shown at 20 and 22 in FIGS. 1 and 4B. Reference may be made to U.S. Pat. Nos. 3,572,168 and 3,604,288 for illustrations of electronic control modules capable of utilizing input torque signals in an automatic transmission to produce a resultant output control signal that can be used to regulate line pressure or to produce a similar control response. Reference to an electronic transmission control module may be found also in a publication by the Renault Company of France describing the Renault 16TA transmission entitled: "Workshop Manual MR96-R1153", printed February 1969 by Servant-Crouzet.

A manual selector, schematically illustrated at 198, permits the operator to choose an operating drive range. If a reverse drive operation is selected, solenoid controls 186 and 188 are actuated. If neutral is selected, the solenoid controls assume the position shown in FIGS. 4A and 4B. If the automatic drive range is selected, automatic ratio shifts are achieved by valves 84 and 86 in the manner previously described. Similarly, continuous operation in the intermediate ratio or in the low speed ratio can be achieved by selecting either range 2 or range 1.

The electronic module receives the signals and produces a response indicated on the right hand side of FIG. 2. The particular mode of the response depends upon the manual selection made by the operator.

As indicated previously, the cutback in the operating pressure level maintained by the regulator valve is achieved by exhausting the upper end of the valve land 124. If the operating zone in which the cutback will occur is the operating zone for any given speed and any given engine manifold vacuum within the lower left-hand corner of the diagram of FIG. 3, a cutback will occur. Similarly, if the mode of operation is in the operating zone indicated in the upper right-hand corner of FIG. 3, a cutback will not occur. A cutback will occur, however, whenever the relationship of pressure to engine manifold vacuum falls between these two operating zones. The pressure-vacuum curve labeled number 1 in FIG. 3 indicates a so-called base line relationship after a cutback occurs. The slope on this curve is due to the influence of the output signal developed by the throttle valve assembly 22.

Figure 3:
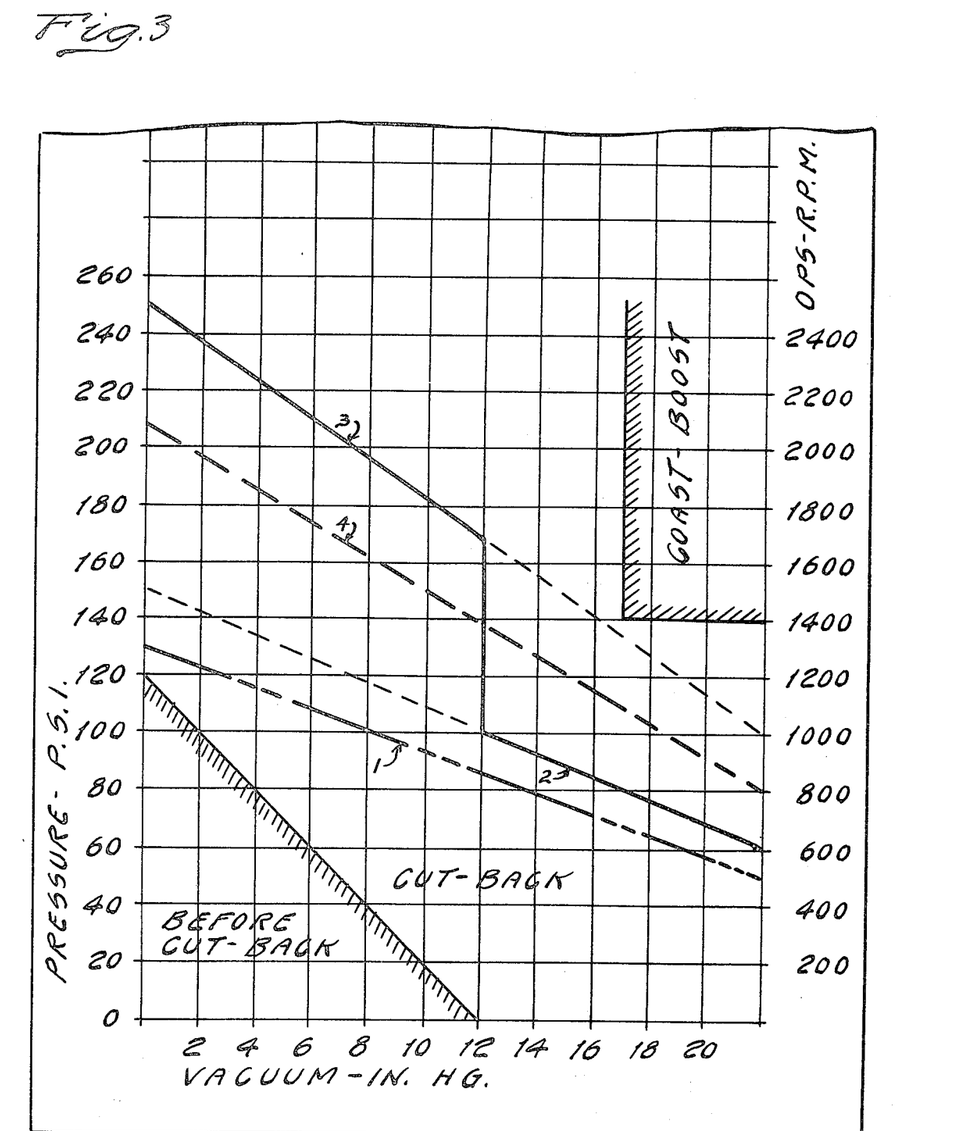
FIG. 3 is a chart indicating the relationship between engine manifold vacuum and line pressure for the control system of my invention.

Line number 4 in FIG. 3 indicates a boosted line pressure relationship between pressure and engine manifold vacuum. The corresponding curves for reverse drive operation are indicated by the legends 2 and 3. The portion of the curve labeled by legend 3 is for high input load before cutback, and the portion of the curve labeled with legend 2 indicates idle engagement at low input loads. The pressure on the differential area of lands 126 and 124 during reverse drive is exhausted since the forward clutch 50 is exhausted.

Having thus described a preferred form of my invention, what I claim and desire to secure by U.S. Letters Patent is:

1. A multiple ratio power transmission mechanism comprising planetary gear elements forming plural torque delivery paths of different speed ratios between a driving member and a driven member, clutch means and brake means for controlling the relative motion of the elements of the gear units to condition said mechanism for speed ratio changes, servo means for actuating said clutch and brake means, a fluid pressure source, conduit structure connecting said pressure source and said servo means, said conduit structure including selectively operable pressure distributor valves for establishing and disestablishing a fluid connection between said pressure source and pressure sensitive parts of said servo means, a pressure regulator valve means for maintaining a controlled pressure level in said conduit structure including a pressure regulator valve element, a valve chamber receiving said valve element, said chamber being in fluid communication with said pressure source and a high pressure portion of said conduit structure, said valve element controlling the degree of communication between the pressure source and said high pressure conduit structure portion, a pressure area on said regulator valve element, a first signal passage connecting said area and high pressure portions of said conduit structure, other signal passages communicating with pressure areas on said distributor valves and said high pressure portions, each signal passage being defined in part by an orifice, and automatically operable pilot valve means for opening and closing said signal passage orifice including a valve element registering with said orifice, spring means acting on said valve element, electric solenoid windings adjacent said valve element adapted to establish a valve element operating electromotive force opposing said spring means whereby said pressure areas may be selectively pressurized and exhausted thus inducing a cutback in the magnitude of the pressure level maintained by said regulator valve means and effecting speed ratio changes, said solenoid windings forming a part of an electronic control module that is controlled by the speed of said driven member, the driving torque and the speed ratio selection.

2. A multiple ratio power transmission mechanism comprising planetary gear elements forming plural torque delivery paths of different speed ratios between a driving member and a driven member, clutch means and brake means for controlling the relative motion of the elements of the gear units to condition said mechanism for speed ratio changes, servo means for actuating said clutch and brake means, a fluid pressure source, conduit structure connecting said pressure source and said servo means, said conduit structure including selectively operable pressure distributor valves for establishing and disestablishing a fluid connection between said pressure source and pressure sensitive parts of said servo means, a pressure regulator valve means for maintaining a controlled pressure level in said conduit structure including a pressure regulator valve element, a valve chamber receiving said valve element, said chamber being in fluid communication with said pressure source and a high pressure portion of said conduit structure, said valve element controlling the degree of communication between the pressure source and said high pressure conduit structure portion, a pressure area on said regulator valve element, a first signal passage connecting said area and high pressure portions of said conduit structure, other signal passages connecting pressure areas on said distributor valve and said high pressure portions, each signal passage being defined in part by an orifice, automatically operable pilot valve means for opening and closing said signal passage orifice including a valve element registering with said orifice, spring means acting on said valve element, electric solenoid windings adjacent said valve element adapted to establish a valve element operating electromotive force opposing said spring means whereby said pressure areas may be selectively pressurized and exhausted thus inducing a cutback in the magnitude of the pressure level maintained by said regulator valve means and effecting speed ratio changes, said solenoid windings forming a part of an electronic control module circuit that is controlled by the speed of said driven member, the driving torque and the speed ratio selection, means for developing a pressure signal that is proportional in magnitude to the torque applied to said driving member, a second control area on said regulator valve element, a fluid connection between said pressure signal source and said second control area whereby the magnitude of the controlled pressure level maintained by said regulator valve means is proportional to the torque applied to said driving member.

3. The combination as set forth in claim 1 wherein said regulator valve means includes a spring adapted to urge movable portions thereof in a direction that increases the degree of communication between said pressure source and said high pressure conduit structure portion, the pressure force applied to said first named pressure area opposing the force of said spring.

4. The combination as set forth in claim 2 wherein said regulator valve means includes a spring adapted to urge movable portions thereof in a direction that increases the degree of communication between said pressure source and said high pressure conduit structure portion, the pressure force applied to said first named pressure area opposing the force of said spring.

5. The combination as set forth in claim 1 wherein one of said servo means is pressurized during forward drive operation and is exhausted during reverse drive operation, an auxiliary pressure area on said regulator valve means being in fluid communication with said one servo means whereby the pressure force acting on said auxiliary area complements the pressure force acting on said first named pressure area.

6. The combination as set forth in claim 2 wherein one of said serve means is pressurized during forward drive operation and being exhausted during reverse drive operation, an auxiliary pressure area on said regulator valve means being in fluid communication with said one servo means whereby the pressure force acting on said auxiliary area complements the pressure force acting on said first named pressure area.

7. The combination as set forth in claim 3 wherein one of said servo means is pressurized during forward drive operation and being exhausted during reverse drive operation, an auxiliary pressure area on said regulator valve means being in fluid communication with said one servo means whereby the pressure force acting on said auxiliary area complements the pressure force acting on said first named pressure area.

8. The combination as set forth in claim 4 wherein one of said servo means is pressurized during forward drive operation and being exhausted during reverse drive operation, an auxiliary pressure area on said regulator valve means being in fluid communication with said one servo whereby the pressure force acting on said auxiliary area complements the pressure force acting on said first named pressure area.

* * * * *